United States Patent [19]

Takei

[11] Patent Number: 5,757,448
[45] Date of Patent: May 26, 1998

[54] POLYMER DISPERSED LIQUID CRYSTAL WITH LARGER PORE SIZES IN SHORTER WAVELENGTH REGIONS

[75] Inventor: Jiro Takei, Tama, Japan

[73] Assignee: Casio Computer Co., Ltd., Tokyo, Japan

[21] Appl. No.: 630,193

[22] Filed: Apr. 10, 1996

Related U.S. Application Data

[63] Continuation of Ser. No. 218,908, Mar. 28, 1994, abandoned.

Foreign Application Priority Data

Mar. 30, 1993 [JP] Japan ................... 5-071575
Mar. 30, 1993 [JP] Japan ................... 5-071576

[51] Int. Cl.$^6$ .............................. G02F 1/1333
[52] U.S. Cl. .............................. 349/92; 349/86
[58] Field of Search ................ 359/51, 52; 349/86, 349/92, 93, 107

[56] References Cited

U.S. PATENT DOCUMENTS

| | | | |
|---|---|---|---|
| 4,818,070 | 4/1989 | Gunjima et al. | 359/43 |
| 5,096,282 | 3/1992 | Margerum et al. | 359/51 |
| 5,216,531 | 6/1993 | Hirai et al. | 359/51 |
| 5,317,431 | 5/1994 | Yoshida et al. | 359/51 |
| 5,469,278 | 11/1995 | Takahara et al. | 359/51 |

FOREIGN PATENT DOCUMENTS

1-255832  10/1989  Japan ................... 359/51

*Primary Examiner*—Anita Pellman Gross
*Assistant Examiner*—Kenneth Parker
*Attorney, Agent, or Firm*—Frishauf, Holtz, Goodman, Langer & Chick, P.C.

[57] ABSTRACT

A pair of substrates both having electrodes are arranged to oppose each other and bonded via a sealing member. A liquid crystal/polymer composite film is formed inside this structure, and color filters of red, green, and blue are formed on one of the two substrates. This liquid crystal/polymer composite film consists of liquid crystal domains and a polymer. The liquid crystal domains are so formed that regions corresponding to the color filters of different colors have an essentially equal optical effect on light components having the respective transmission wavelength bends of these color filters. The polymer is formed by polymerizing a photosetting polymeric material. To form the liquid crystal/polymer composite film having the optical effects for the individual color filters, a polymer dispersed liquid crystal display device with this arrangement is manufactured by radiating light for polymerizing the polymeric material onto a solution mixture of the liquid crystal and the polymeric material while adjusting the intensity of the light in each region corresponding to one of the color filters.

36 Claims, 5 Drawing Sheets

POLYMER DISPERSED LIQUID CRYSTAL WITH LARGER PORE SIZES IN SHORTER WAVELENGTH REGIONS

This application is a continuation of application Ser. No. 08/218,908, filed Mar. 28, 1994, now abandoned.

BACKGROUND OF THE INVENTION

1. Field of the Invention

The present invention relates to a composite film composed of a polymer and a liquid crystal, a polymer dispersed liquid crystal display device using this composite film, and methods of manufacturing the composite film and the polymer dispersed liquid crystal display device.

2. Description of the Related Art

A composite film composed of a polymer and a liquid crystal is used in a polymer dispersed liquid crystal display device.

The polymer dispersed liquid crystal display device is manufactured by forming a liquid crystal/polymer composite film, in which a polymer and a liquid crystal are separated from each other, between a pair of transparent substrates each having transparent electrodes. The composite film has either a structure in which the liquid crystal is confined in spaces of the polymer which is so polymerized as to have a sponge-like section, or a structure in which capsules of the liquid crystal are dispersed in the polymer.

The polymer dispersed liquid crystal display device of this type is driven by applying a voltage between the electrodes of the two substrates. When no voltage is applied, the liquid crystal molecules of liquid crystal domains (aggregates of the liquid crystal) dispersed in the polymer point in various directions. In this state, light incident on the composite film is scattered by the light scattering effect of the interfaces between the liquid crystal domains and the polymer, and of the liquid crystal domains. When a voltage equal to or higher than the threshold voltage of the liquid crystal dispersed in the polymer is applied to the composite film between the electrodes, the liquid crystal molecules of the liquid crystal domains are uniformly oriented in a direction substantially perpendicular to the surfaces of the substrates. Therefore, the incident light is transmitted through the composite film under almost no influence of the light scattering effect.

That is, the above polymer dispersed liquid crystal display device performs display by using the transmission and the scattering of light incident on the device. Since the device requires no polarizing plate, it can provide brighter images than those displayed by TN type liquid crystal display devices generally used.

One type of this polymer dispersed liquid crystal display device is conventionally manufactured by the following method. That is, a pair of transparent substrates are bonded via a frame-like sealing member, and a solution mixture of a liquid crystal and a polymeric material which causes a polymerization reaction upon being irradiated with light is sealed in a region surrounded by the sealing member between the two substrates. Thereafter, light (ultraviolet radiation) evenly radiates on the entire solution mixture sealed region from the outer surface side of one substrate, thereby photopolymerizing the polymeric material.

When light radiates on the solution mixture sealed between the substrates, a radical polymerization reaction takes place in which the double bonds of the polymeric material in the form of a monomer or an oligomer dissociate into free radicals, and adjacent free radicals combine to form a polymer. This polymerization of the polymeric material causes phase-separation of the liquid crystal and the polymer from each other.

Consequently, the polymeric material is so polymerized as to have a sponge-like section to thereby form a polymer portions, and a liquid crystal is confined in spaces of these polymer portions. The result is the composite film mentioned earlier. Note that this composite film formation method is called a photopolymerization phase-separation method.

The above polymer dispersed liquid crystal display device has been conventionally used in a monochromatic gray-level display generally termed a black-and-white display. Recently, however, studies have been made to form a multicolor display by forming color filters of a plurality of colors on one substrate of the polymer dispersed liquid crystal display device.

When used in forming the monochromatic gray-level display, the above conventional polymer dispersed liquid crystal display device including the composite film composed of a liquid crystal and a polymer can provide a high-quality display in which the brightness is nearly uniform throughout the display screen. If, however, the device of this type is used to form a multicolor display by using a plurality of color filters, light components of different colors differ from one another in brightness on the screen.

Polymer dispersed liquid crystal display devices of a multicolor display type manufactured by conventional manufacturing methods include color filters of three colors, that is, red, green, and blue.

In the polymer dispersed liquid crystal display device of this type, regardless of the homogeneous structure of the composite film, the optical characteristics, such as the degree of scattering and the transmittance, with respect to red, green, and blue light components transmitted through the color filters, differ from one color to another.

This is so because the light transmitting characteristics of the liquid crystal/polymer composite film have a wavelength dependence; that is, of light components with wavelengths in a visible light region, the transmittance for light having a long-wavelength band is high, whereas that for light having a short-wavelength band is low. More specifically, red light transmitted through the red filter has a long wavelength, green light transmitted through the green filter has an intermediate wavelength, and blue light transmitted through the blue filter has a short wavelength. Therefore, the light components of these colors differ in transmittance due to the wavelength dependence of the composite film.

For this reason, uniformizing the brightnesses of these colors on the screen has been conventionally attempted by adjusting the quantities of light transmitted through these color filters by using the color filters having different thicknesses, or by adjusting the orientation of the liquid crystal molecules upon application of a voltage by applying different voltages to regions corresponding to different color filters, thereby compensating for the wavelength dependence of the composite film.

If, however, the thickness of the color filter must differ from one filter to another as described above, the formation of the color filters becomes, difficult. In addition, the thickness of a given color filter must be extremely increased or decreased depending on the color of that filter. This makes it difficult to adjust the lightness, hue, and saturation of light transmitted through that filter, resulting in a degraded display quality. Also, applying different voltages to regions corresponding to different color filters complicates the liquid crystal display device driving method.

SUMMARY OF THE INVENTION

It is one object of the present invention to provide a composite film capable of adjusting optical characteristics for each of a plurality of light components with different wavelength bands.

To achieve the above object, a composite film of the present invention contains a liquid crystal material and a polymer, and has a plurality of regions on which light components with wavelength bands differing from one another are incident, and which have different optical characteristics to light having one specific wavelength band.

As described above, since the regions of this composite film have different optical characteristics with respect to light having one wavelength band, it is possible to optimize the optical characteristics of these regions independently of one another with respect to light components having different wavelength bands. That is, the wavelength dependence of this composite film can be compensated for in accordance with the wavelength band of light.

In the above composite film, each of a plurality of regions has a plurality of microscopic liquid crystal domains which are aggregates of the liquid crystal material, and a plurality of microscopic portions consisting of the polymer. This liquid crystal domain is of a capsule type in which the outer surface of the domain is surrounded by the polymer, and may also take a polyhedral shape. This composite film may be of a polymer network type in which the liquid crystal domains are formed in the three-dimensional network structure of the polymer.

A composite film according to another aspect of the present invention has a plurality of regions on which light components with different wavelength bands are incident, and which have an essentially equal optical effect on their respective light components with different wavelength bands.

In this composite film, the optical effects, such as the scattering effects and the transmitting effects, of the plurality of regions are optimized with respect to their respective light components with different wavelength bands to be incident on these regions. This makes it possible to uniformize the intensities of the scattered light or the transmitted light of these regions of the composite film.

These regions have an essentially equal scattering effect or transmitting effect for the respective light components with different wavelength bands. In addition, these regions have liquid crystal domains in such a manner that any of the area of the interface between the liquid crystal and the polymer, the length of the liquid crystal domain in the direction of thickness of the composite film, the volume of the domain, and the shape of the domain differs from one region to another.

It is another object of the present invention to provide a polymer dispersed liquid crystal display device capable of performing a high-quality multicolor display by optimizing the brightness of each color to be displayed without using color filters having different thicknesses or applying different drive voltages to regions corresponding to respective color filters differ in their colors.

The polymer dispersed liquid crystal display device according to another aspect of the present invention comprises a substrate on which a first electrode or electrodes are formed, a composite film which is arranged on the electrodes and has a plurality of regions on which light components with different wavelength bands are incident, and in which a liquid crystal material and a polymer are so mixed that the regions have an essentially equal scattering effect on their respective light components with different wavelength bands, and a second electrode or electrodes so arranged as to oppose the first electrodes with the composite film sandwiched between them.

In the above polymer dispersed liquid crystal display device, the plurality of regions on which light components with different wavelength bands are incident have an essentially equal optical effect on their respective light components with difference wavelength bands. This makes it possible to uniformize the intensities of scattering or transmission of these regions with respect to light components having different wavelengths. Consequently, a multicolor display can be performed in vivid colors.

The above display device uses the composite film having microscopic liquid crystal domains which are aggregates of the liquid crystal material, and microscopic portions consisting of the polymer. Each region of the composite film has the polymer formed into a three-dimensional network structure, and the plurality of microscopic liquid crystal domains which are aggregates of the liquid crystal material formed in the network structure of the polymer.

In the composite film of the above display device, the polymer and the liquid crystal material are so mixed that the plurality of regions on which light components with different wavelength bands are incident have an essentially equal scattering effect. In this case, any of the area of the interface between the liquid crystal domain and the microscopic polymer portion, the lengths of the liquid crystal domains in the direction of thickness of the composite film, and the volumes of the liquid crystal domains may differ from one region to another.

The above display device further comprises optical means which is arranged outside the composite film and selectively transmits the light components with different wavelength bands to be incident on the plurality of regions. This optical means consists of filters of a plurality of colors, preferably color filters of three primary colors, that is, red, green, and blue. In the display device including the color filters of three primary colors, the regions of the composite film, which correspond to the red, green, and blue filters, have liquid crystal domains such that any of the mean of the lengths of the liquid crystal domains in the direction of thickness of the composite film, the mean of the areas of the interfaces between the liquid crystal domains and the polymer, and the mean of the volumes of the liquid crystal domains increases in an order of red, green, and blue.

Another polymer dispersed liquid crystal display device according to still another aspect of the present invention comprises a first substrate having a filter in which a plurality of regions each for selectively transmitting one of light components with a plurality of wavelength bands are formed, and first electrodes so arranged above the filter that at least one of the first electrodes corresponds to one of the regions of the filter, a second substrate having at least one second electrode opposing the first electrodes, and arranged apart from the first substrate with a predetermined spacing between them, and a polymer dispersed liquid crystal layer so arranged as to be sandwiched between the first and second electrodes, and formed by compounding a liquid crystal material and a polymer such that the regions of the filter, each of which selectively transmits one wavelength band, have an essentially equal scattering effect on their respective light components with different wavelength bands.

In the above polymer dispersed liquid crystal display device, light components incident through the first substrate and having the transmission wavelength bands of the individual filters are selectively transmitted through the filters and radiated on the polymer dispersed liquid crystal layer having the plurality of regions corresponding to these light components with a plurality of wavelength bands. With this arrangement, the regions on which the light components with different wavelength bands are radiated have an essentially equal scattering effect on their respective light components. Consequently, the brightnesses of the individual colors to be displayed can be readily optimized without adjusting the filters. This enables a high-quality multicolor display with a high color balance.

It is still another object of the present invention to provide a method of forming a composite film in which a plurality of regions on which light components with different wavelength bands are incident have different optical characteristics one another.

To achieve the above object, a method of manufacturing a composite film according to the present invention comprises the first step of forming a layer of a solution mixture consisting of a liquid crystal material and a polymeric material on one surface of a substrate, and the second step of polymerizing the polymeric material by varying energy for promoting the polymerization of the polymeric material in a plurality of regions, on which light components with different selected wavelength bands are incident, such that the energy differs from one region to another, in order that the regions have different optical characteristics to light with a specific wavelength band.

In the above method, in the plurality of regions, which are formed in the layer made from the solution mixture of the liquid crystal material and the polymeric material that becomes a polymer upon polymerization, and on which light components with different wavelength bands are incident, the energy for promoting the polymerization of the polymeric material differs from one region to another. Consequently, the polymeric material is so polymerized that the mixed state of the polymer and the liquid crystal differs from one region to another. This makes it possible to optimize the optical characteristics of these regions independently of one another with respect to their respective wavelength bands.

In this case, the energy for promoting the polymerization of the polymeric material may be either light energy or heat energy. When light energy is to be used, the regions can be sequentially scanned while the intensity of the light energy is changed. Alternatively, the light may be radiated on the regions, on which light components with different wavelength bands are incident, through light adjusting means for adjusting the intensity of the light for each region, e.g., an optical mask having different transmitting light intensities for different regions.

It is still another object of the present invention to provide a method of manufacturing a polymer dispersed liquid crystal display device capable of performing a high-quality multicolor display with a high color balance by optimizing the brightnesses of colors to be displayed on regions on which light components with different wavelength bands are incident.

To achieve the above object, a method of manufacturing a polymer dispersed liquid crystal display device of the present invention comprises the first step of filling a solution mixture consisting of a liquid crystal material and a polymeric material between a first substrate having an optical filter for forming regions for transmitting light components with different wavelength bands and a first electrode, and a second substrate having a second electrode opposing the first electrode and arranged to oppose the first substrate with a predetermined spacing between them, thereby forming a layer of the solution mixture between the first and second substrates, and the second step of polymerizing the polymeric material by supplying energy for promoting the polymerization of the polymeric material such that the regions of the solution mixture layer for transmitting light components with different wavelength bands selected by the optical filter have different optical characteristics with respect to light with a predetermined wavelength band, thereby forming a polymer dispersed liquid crystal layer.

By the above method, it is possible to form the layer of a polymer and the liquid crystal material having an even thickness between the first and second substrate having their respective electrodes. Consequently, a polymer dispersed liquid crystal display device for performing a high-quality multicolor display can be formed through a simple manufacturing process.

In the first step, after the first and second substrates are arranged to oppose each other with a predetermined spacing between them, the solution mixture is injected between the first and second substrates. As an alternative, the solution mixture is coated on at least one of the first and second substrates, and then the two substrates are bonded.

This device manufacturing method further comprises the steps of forming color filters of three primary colors, red, green, and blue, and radiating light onto the regions such that the energy of the radiated light decreases in an order of the regions corresponding to the red, green, and blue filters.

By this manufacturing method, it is possible to manufacture a high-quality polymer dispersed liquid crystal display device including color filters of three primary colors and capable of displaying the three colors with a high color balance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 3 illustrate a polymer dispersed liquid crystal display device according to the first embodiment of the present invention, in which

FIGS. 5A to 5C are views for explaining the manufacturing steps of the device shown in FIG. 4, in which

DETAILED DESCRIPTION OF THE PREFERRED EMBODIMENTS

The embodiments of the present invention will be described in detail below with reference to the accompanying drawings.

Figure 1:
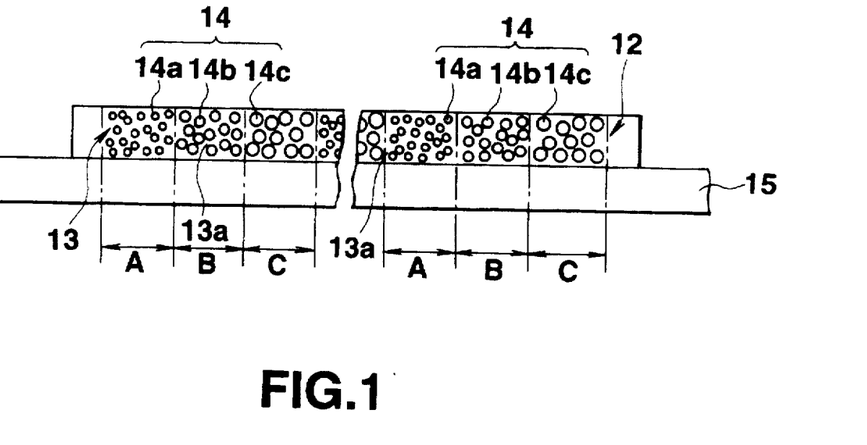
FIG. 1 is a sectional view showing a composite film used in this device.
Figure 2:
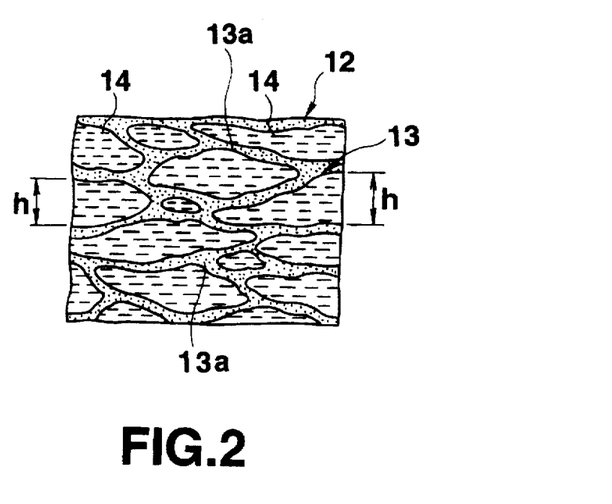
FIG. 2 is an enlarged sectional view showing part of FIG. 1.

A composite film having a liquid crystal material and a polymer for use in a polymer dispersed liquid crystal display device according to the first embodiment of the present invention will be described with reference to FIGS. 1 and 2. FIG. 1 is a sectional view showing the composite film, and FIG. 2 is an enlarged view showing a portion of the liquid crystal/polymer composite film.

This composite film 12 is a thin film formed on a transparent substrate 15 by mixing a polymer 13 and a liquid crystal 14. The composite film 12 is constituted by microscopic liquid crystal domains 14a, 14b, and 14c which are aggregates of a liquid crystal material, and the polymer 13 present around the liquid crystal domains 14. Microscopic polymer portions 13a of the polymer 13 present between the liquid crystal domains 14 are formed into a three-dimensional network such that these microscopic polymer portions overlap in the direction of thickness of the composite film 12.

The composite film 12 with the above arrangement has, in the direction of its plane, a plurality of, e.g., in this embodiment, three regions A, B, and C having different optical characteristics to light with one particular wavelength band. That is, the optical characteristics differ from one region to another in accordance with the difference in the mixed state of the liquid crystal domain and the polymer. For example, for light having one wavelength band in a visible light region, the scattering property and/or the transmittance of the composite film 12 differs from one region to another. In this composite film, the liquid crystal domains and the polymer are so mixed that the regions A, B, and C, on which light with a long-wavelength band, light with an intermediate-wavelength band, and light with a short-wavelength band are incident, have an essentially equal optical effect on their respective light components having different wavelength bands.

In this composite film 12, in the first region A on which light having a long-wavelength band of a visible light region is incident, the second region B on which light having an intermediate-wavelength band is incident, and the third region C on which light having a short-wavelength band is incident, the diameters (the maximum lengths in the direction of thickness) of the liquid crystal domains 14a, 14b, and 14c in the direction of thickness of the composite film 12, which is the direction of incidence of light, differ from one region to another.

As shown in FIG. 1, the scale, size, or diameter of the liquid crystal domains 14a, 14b, and 14c increases in this order. Referring to FIG. 1, these liquid crystal domains are illustrated as circles, and their diameters are almost equal in each of these regions. The liquid crystal domains are of a capsule type in which the outer surface of the domain is surrounded by the polymer 13, or of a polymer network type with an irregular shape in which the liquid crystal material aggregates in the three-dimensional network structure of the polymer, as shown in FIG. 2.

If there is a variation in any of the liquid crystal domains 14a, the liquid crystal domains 14b, and the liquid crystal domains 14c in the direction of thickness of the composite film 12, the mean of the diameters of the liquid crystal domains in the direction of thickness of the film 12 in each region on which light having one particular wavelength band is incident need only differ from one region to another.

Referring to FIG. 2, the size or diameter of the liquid crystal domains 14 is a length h in the direction of thickness of the film 12. In the regions on which light components with wavelength bands of different colors are incident, this length differs from one region to another so that these regions have an essentially equal optical effect on these light components of wavelength bands corresponding to the regions.

The optical characteristics of the regions on which light components having different wavelength bands are incident change in accordance with the mean of the lengths h of the liquid crystal domains 14 in the direction of thickness of the film 12. That is, as the mean of the lengths h decreases, the scattering property increases, and the transmittance decreases. As the mean of the lengths h increases, the scattering property decreases, and the transmittance increases.

For this reason, the length h of the liquid crystal domains 14a in the direction of thickness of the composite film 12 in the region of the film 12 on which light having a long-wavelength band is incident is set at a small value, the length h of the liquid crystal domains 14b in the direction of thickness of the film 12 in the region on which light having an intermediate-wavelength band is incident is set at a medium value, and the length h of the liquid crystal domains 14c in the direction of thickness of the film 12 in the region on which light having a short-wavelength band is incident is set at a large value. This compensates for the wavelength dependence of the transmittance of each region of the film 12. Consequently, light components with long-, intermediate-, and short-wavelength bands are transmitted through the first, second, and third regions A, B, and C, respectively, at substantially the same transmittance.

As the light components having long-, intermediate-, and short-wavelength bands, it is desirable to select light components having the wavelength bands of red, green, and blue, respectively.

In addition, in order that the regions of the composite film 12, on which light components with different wavelength bands are incident, have an equal scattering effect on their respective light components having different wavelength bands, the mean or the sum total of the areas of the interfaces between the liquid crystal domains 14 and the microscopic polymer portions 13a in contact with the liquid crystal domains 14 is set to differ from one region to another.

That is, if a large number of small liquid crystal domains are present in a given region, the mean of the domain areas decreases, and the sum total of these areas increases, resulting in a large scattering effect. If, in contrast, a small number of large liquid crystal domains are present in one region, the mean of the areas increases, and the sum total of these areas decreases, resulting in a small scattering effect.

For this reason, the composite film 12 has a structure in which the mean or the sum total of the areas of the interfaces between the plurality of liquid crystal domains 14 (14a, 14b, or 14c) and the microscopic polymer portions 13a in contact with these liquid crystal domains 14 differs from one region to another.

The volumes of the liquid crystal domains may also be set to differ from one region to another, in order that the regions of the composite film 12 have an essentially equal scattering effect on light components with different wavelength bands to be incident on these regions. For this purpose, either the mean or the sum total of the volumes of the liquid crystal domains may differ from one region to another.

The liquid crystal domains of the above composite film 12 can have a polyhedral shape whose section in the direction of thickness of the film 12 assumes a hexagonal shape like as a honeycomb. The liquid crystal domains can also be spherical.

Note that the composite film can also have a structure in which the shape of the liquid crystal domains differs from one region to another.

A polymer dispersed liquid crystal display device using the composite film with the above arrangement will be described below with reference to FIG. 3.

Figure 3:
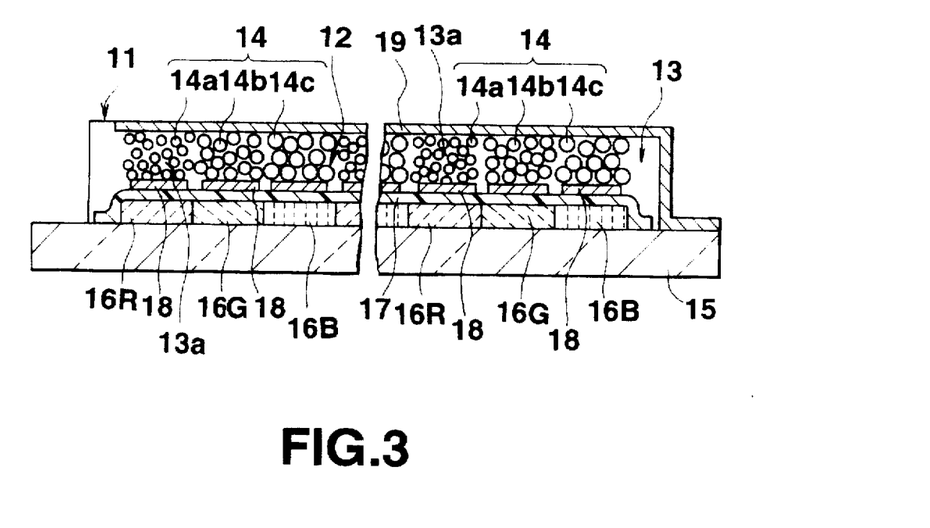
FIG. 3 is a schematic sectional view of the overall device.

FIG. 3 is a sectional view showing this polymer dispersed liquid crystal display device.

In this polymer dispersed liquid crystal display device 11 shown in FIG. 3, three groups of color filters 16R, 16G, and 16B of three colors, red, green, and blue, a protective insulating film 17, and a plurality of elongate transparent electrodes 18 are formed on a transparent substrate 15 consisting of glass or the like. A liquid crystal/polymer composite film 12 is formed on the insulating film 17 and electrodes 18. On this composite film 12, a plurality of elongate transparent electrodes 19 are formed in correspondence with the transparent electrodes 18.

Note that the liquid crystal display device of this embodiment is of a simple matrix type, in which the transparent electrodes 18 formed on the substrate 15 are scanning electrodes, and the transparent electrodes 19 formed on the composite film 12 are signal electrodes.

The color filter assembly described above is formed by alternately arranging the red, green, and blue filters 16R, 16G, and 16B. The scanning electrodes 18 are formed on the protective insulating film 17 covering the color filters 16R, 16G, and 16B.

The color filters 16R, 16G, and 16B are arranged in a mosaic manner (i.e., alternately arranged in the longitudinal and lateral directions) to form a pixel pattern corresponding to the pattern of pixels at which the opposing scanning and signal electrodes 18 and 19 cross each other. Alternatively, the color filters 16R, 16G, and 16B are formed into stripes corresponding to the arrays of pixels.

In this liquid crystal display device, the composite film 12 has a structure in which, in regions corresponding to the color filters 16R, 16G, and 16B of three colors, red, green, and blue, the size of the liquid crystal domains, which are dispersed between the microscopic polymer portions 13a, in the direction of thickness of the composite film 12 differs from one region to another in accordance with the transmission wavelength bands of these color filters 16R, 16G, and 16B.

That is, in this liquid crystal display device, the size of the liquid crystal domain 14 of the composite film 12 in the direction of thickness of the film is increased in an order of the first region corresponding to the red filter 16R for transmitting light having a long-wavelength band in a visible light region, the second region corresponding to the green filter 16G for transmitting light having an intermediate-wavelength band, and the third region corresponding to the blue filter 16B for transmitting light having a short-wavelength band.

Referring to FIG. 3, the liquid crystal domains 14 of the composite film 12 are expressed as circles, and all of the liquid crystal domains 14 in regions corresponding to color filters of the same color have almost the same size. In a practical case, however, the liquid crystal domains 14 of non-capsules type have irregular shapes, and there are variations in the size of the liquid crystal domains 14 even in regions corresponding to color filters of the same color.

For this reason, the size of the liquid crystal domains 14 in the direction of thickness of the composite film is desirably the mean of the sizes of all the liquid crystal domains 14, which are present in regions corresponding to color filters of the same color, in the direction of thickness of the composite film.

In the polymer dispersed liquid crystal display device of this embodiment, in regions corresponding to the color filters 16R, 16G, and 16B, the size of the liquid crystal domains 14 in the direction of thickness of the liquid crystal/polymer composite film 12 (the mean size in the direction of thickness of the composite film 12) differs from one region to another in accordance with the transmission wavelength bands of the color filters 16R, 16G, and 16B. Therefore, the wavelength dependence of the transmittance of the composite film 12 is compensated for, so the individual regions have an essentially equal optical effect with respect light components having the respective corresponding wavelength bands.

That is, in the above composite film 12, the transmittance of light with a given wavelength band changes in accordance with the length h of the liquid crystal domains 14 in the direction of thickness of the film. More specifically, when the length of the liquid crystal domains 14 in the direction of thickness of the film is small, the transmittance is low because the density of liquid crystal domains 14 is high. When the length of the liquid crystal domains 14 in the direction of thickness of the film is large, the transmittance is high because the density of liquid crystal domains 14 is low.

For this reason, the size of the liquid crystal domains 14 in the direction of thickness of the composite film 12, in a region corresponding to the color filter for transmitting light having a long-wavelength band is decreased, and the size of the liquid crystal domains 14 in the direction of the thickness in a region corresponding to the color filter for transmitting light having a short-wavelength band is increased. This compensates for the wavelength dependence of the transmittance of the composite film 12. Consequently, light components (red, green, and blue light components) transmitted through the respective color filters 16R, 16G, and 16B and having different wavelength bands are transmitted through the composite film 12 at substantially the same transmittance. In addition, these light components exhibit nearly the same scattering characteristics.

Since the regions of the film 12, on which light components with different wavelength bands are incident, and which correspond to the respective color filters, can have an equal scattering effect on their respective light components with different wavelength bands to be incident on them, the brightness of each wavelength band to be displayed can be optimized. This makes it possible to realize a high-quality multicolor display in which the brightnesses of the individual colors displayed are uniform without changing the thickness of the color filter or the drive voltage for each of regions corresponding to the individual color filters, as in conventional devices.

In the polymer dispersed liquid crystal display device 11 with the above arrangement, a voltage equal to or higher than the threshold voltage of the liquid crystal material surrounded by the microscopic polymer portions 13a is applied to the polymer dispersed liquid crystal film between the first and second electrodes. Consequently, the liquid crystal material is arranged in a predetermined direction in accordance with the intensity of the electric field. The scattering property decreases according to the arrangement of the liquid crystal molecules, thereby transmitting light through the color filters and realizing a color display.

The color display characteristics of the film 12 can be improved by essentially equalizing the degrees of scattering of light components with different wavelength bands selected by the color filters 16R, 16C, and 16B in the regions of the film 12 on which these light components are incident.

In this case, in three types of the regions A, B, and C on which light components with different wavelength bands, i.e., light components transmitted through three types of the color filters 16R, 16G, and 16B, respectively, are incident, the area of the interface of one liquid crystal domain 14 (14a, 14b, or 14c) or the sum total of the areas of the interfaces of the liquid crystal domains 14, may differ from one region to another in order that the scattering effects of these regions may be essentially equal.

Furthermore, in order to adjust the length h of the liquid crystal domains 14 in each region in the direction of thickness of the film 12 or to adjust the areas of the interfaces between these liquid crystal domains 14 and the plurality of polymer portions 13a in contact with the domains 14, the volume of the liquid crystal domains 14 may also be set to differ from one region to another. For this purpose, either the mean or the sum total of the volumes of the liquid crystal domains may differ from one region to another.

The polymer dispersed liquid crystal display device of the above embodiment includes the red, green, and blue filters 16R, 16G, and 16B. The present invention, however, is also applicable to a polymer dispersed liquid crystal display device having color filters of other colors. For example, when the present invention is to be applied to a polymer dispersed liquid crystal display device having color filters of three colors, yellow, magenta, and cyan, the mean of the sizes of the liquid crystal domains 14 of the liquid crystal/polymer composite film 12 in the direction of thickness of the composite film is increased in an order of a region corresponding to the filter for yellow as a composite color of red and green, a region corresponding to the filter for magenta as a composite color of red and blue, and a region corresponding to the filter for cyan as a composite color of green and blue.

The arrangement of the polymer dispersed liquid crystal display device is not limited to that of the above embodiment but may be as follows.

Figure 4:
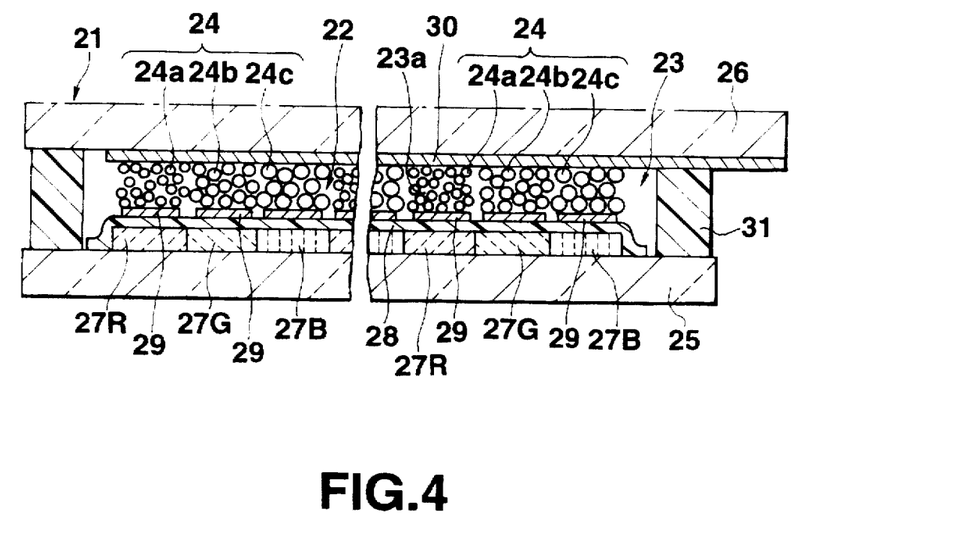
FIG. 4 is a schematic sectional view of a polymer dispersed liquid crystal display device according to the second embodiment of the present invention.

That is, as shown in FIG. 4, a polymer dispersed liquid crystal display device of this second embodiment has an arrangement in which a pair of transparent substrates 25 and 26 consisting of, e.g., glass are bonded via a frame-like sealing member 31 between them, and the composite film described in the above first embodiment is formed as a polymer dispersed liquid crystal layer 22 in a region surrounded by the sealing member 31 between the two substrates 25 and 26. On the inner surface of the first substrate (the lower one in FIG. 4) 25 of the two substrates 25 and 26, color filters 27R, 27G, and 27B of three colors, red, green, and blue, and transparent electrodes 29 are formed. On the inner surface of the second substrate (the upper one in FIG. 4) 26, only transparent electrodes 30 are formed.

Note that the liquid crystal display device of this embodiment is of a simple matrix type, in which the transparent electrodes 29 formed on the first substrate 25 are scanning electrodes, and the transparent electrodes 30 formed on the second substrate 26 are signal electrodes.

The color filter assembly described above is formed by alternately arranging the red, green, and blue filters 27R, 27G, and 27B. The scanning electrodes 29 are formed on a protective insulating film 28 covering the color filters 27R, 27G, and 27B.

The color filters 27R, 27G, and 27B are arranged in a mosaic manner (i.e., alternately arranged in the longitudinal and lateral directions) to form a pixel pattern corresponding to the pattern of pixels at which the opposing scanning and signal electrodes 29 and 30 cross each other. Alternatively, the color filters 27R, 27G, and 27B are formed into stripes corresponding to the arrays of pixels.

In the above liquid crystal/polymer composite layer 22, a polymer 23 and a liquid crystal material are separated each other. More specifically, this composite layer 22 has a structure in which the liquid crystal material is confined in spaces between microscopic polymer portions 23a which are so polymerized as to have a sponge-like section.

In this liquid crystal display device, the composite layer 22 has a structure in which, in regions corresponding to the color filters 27R, 27G, and 27B of three colors, red, green, and blue, the length (the size in the direction of thickness of the composite film) h of liquid crystal domains 24a, 24b, and 24c dispersed between the microscopic polymer portions 23a differs from one region to another in accordance with the transmission wavelength bands of these color filters 27R, 27G, and 27B.

That is, in this liquid crystal display device, the length of the liquid crystal domains 24 of the composite layer 22 in the direction of thickness of the layer is increased in an order of a region corresponding to the red filter 27R for transmitting light having a long-wavelength band in a visible light region, a region corresponding to the green filter 27G for transmitting light having an intermediate-wavelength band, and a region corresponding to the blue filter 27B for transmitting light having a short-wavelength band. Referring to FIG. 4, the liquid crystal domains 24 of the composite layer 22 are expressed as circles, and all of the liquid crystal domains 24 in regions corresponding to color filters of the same color have almost the same size. However, the liquid crystal domains 24 can take either irregular shapes or regular shapes.

In this embodiment, as in the embodiment discussed earlier, the layer 22 can have a structure in which liquid crystal domains which are capsules of the liquid crystal material confined in the polymer, or, one of the non-capsule type, a structure in which the polymer 32 is formed into a three-dimensional network structure and the plurality of microscopic liquid crystal domains 24a, 24b, and 24c which are aggregates of the liquid crystal material are confined between the microscopic polymer portions 23a in the network structure of the polymer 23.

In addition, it is possible to improve the color display characteristics of the layer 22 by essentially equalizing the degrees of scattering of light components with different wavelength bands selected by the color filters 27R, 27G, and 27B in the regions of the layer 22 on which these light components are incident.

In this case, in the plurality of regions on which light components with different wavelength bands, i.e., light components transmitted through the color filters 27R, 27G, and 27B are incident, the mean of the areas of the interfaces between the plurality of liquid crystal domains 24 and the microscopic polymer portions 23a differs from one region to another. Consequently, it is possible to essentially equalize the scattering effects for the light components with different wavelength bands to be incident on these regions.

Furthermore, in the regions on which light components with different wavelength bands are incident, the areas of the interfaces of the liquid crystal domains or the sum total of these areas may differ from one region to another. If the layer 22 having the microcapsule type liquid crystal domains 24 is used, the diameter of the liquid crystal domains 24 may differ from one region to another.

The volume of the liquid crystal domains 24 may also be set to differ from one region to another in order to adjust the length h of the liquid crystal domains 24 in each region in the direction of thickness of the layer 22 or adjust the areas of the interfaces between the liquid crystal domains 24 and the plurality of microscopic polymer portions 23a in contact with these liquid crystal domains 24.

For this purpose, either the mean or the sum total of the volumes of the liquid crystal domains may differ from one region to another.

The liquid crystal domains 24 of the layer 22 can take a polyhedral shape whose section in the direction of thickness of the layer 22 is hexagonal. The liquid crystal domains 24 may also be spherical.

Note that the shape of the liquid crystal domains 24 of the layer 22 may differ from one region to another.

One method of manufacturing the above-mentioned polymer dispersed liquid crystal display device will be described below with reference to FIGS. 5A to 6.

Figure 5A:
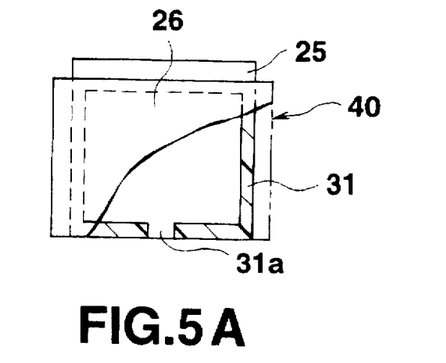
FIG. 5A is a partially cutaway plan view showing a cell formed by combining transparent substrates and a sealing member.
Figure 5B:
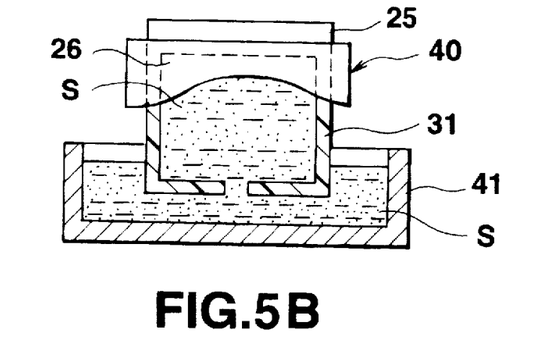
FIG. 5B is a partially cutaway, schematic sectional view of an apparatus for carrying out a solution mixture injection process.
Figure 5C:
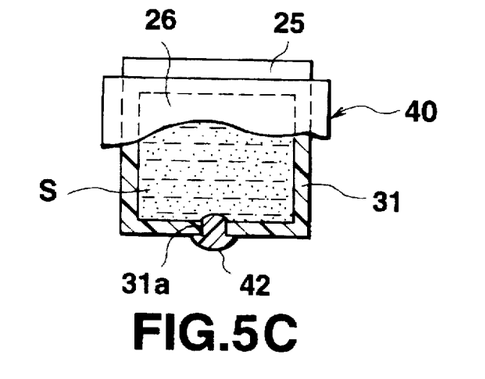
FIG. 5C is a partially cutaway sectional view showing the cell after the solution mixture is injected.

FIGS. 5A to 5C are views showing steps of injecting a solution mixture of a liquid crystal material and a polymeric material for use in the polymer dispersed liquid crystal display device. FIG. 6 is a perspective view for explaining the manufacturing method of this embodiment, in which the state of photopolymerization of a polymeric material is illustrated. The polymer dispersed liquid crystal display device of the second embodiment discussed earlier is manufactured through the following steps.

To begin with, as shown in FIG. 5A, a pair of transparent substrates 25 and 26 are bonded via a sealing member 31 between them, thereby assembling a cell 40. A solution injection port 31a is formed in one side wall of the cell 40 by notching a portion of the sealing member 31.

Subsequently, as shown in FIG. 5B, a solution mixture S of a liquid crystal material and a photosetting polymeric material is injected into the cell 40 by using a vacuum injection process. This solution mixture S is prepared by mixing the liquid crystal material in the photosetting polymeric material at a ratio higher than the solubility at normal temperature and normal pressure, and dissolving the two materials by heating them to a temperature higher than the solution critical temperature as the lower-limit temperature at which they dissolve in that atmosphere. Note that the solution mixture S is added with a free-radical initiator for promoting the radical formation of the photosetting polymeric material.

The injection of the solution mixture is performed in the same fashion as a conventional vacuum injection process.

That is, the cell 40 is set in a vacuum tank (not shown), and the tank is evacuated. Thereafter, the injection port 31a of the cell 40 is dipped in the solution mixture S contained in a vessel 41, and the pressure in the tank is then raised to a pressure equal to or slightly higher than the atmospheric pressure (normal pressure). After the injection, as shown in FIG. 5C, the injection port 31a is sealed with a sealing member 42.

Thereafter, the polymeric material of the solution mixture S is photopolymerized by supplying energy for promoting the polymerization reaction. Consequently, the polymer and the liquid crystal are phase-separated to form a liquid crystal/polymer composite layer 22 (see FIG. 4), thereby completing the polymer dispersed liquid crystal display device.

The above photopolymerization of the polymeric material is performed by scanning the entire solution mixture sealed region with a light beam from the outer surface side of the second substrate 26 having no color filters 27R, 27G, and 27B. Note that ultraviolet laser light is used as the light beam in this embodiment.

Figure 6:
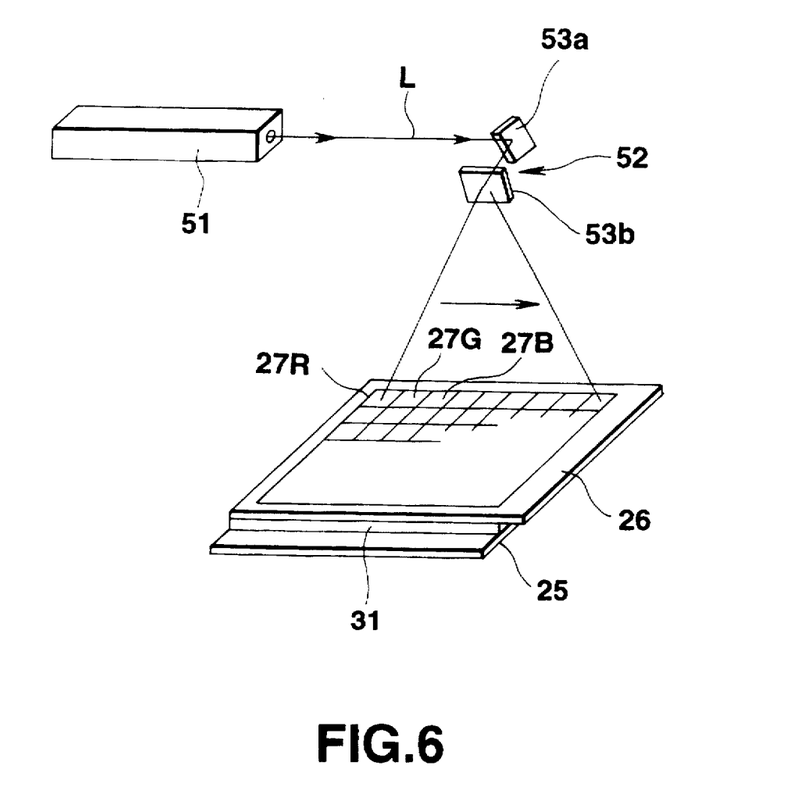
FIG. 6 is a perspective view for explaining a process of polymerizing a polymer of a solution mixture in the manufacture of the display device of the second embodiment.

The scan for the solution mixture sealed region using the laser light is performed as illustrated in FIG. 6. Referring to FIG. 6, the direction of laser light L from a laser light source 51 is controlled by an X-Y scanning mechanism 52 including an X-axis direction tilting mirror 53a and a Y-axis direction tilting mirror 53b.

In this manufacturing method, while the solution mixture sealed region is scanned by the laser light L, the intensity of the laser light L is controlled for each of regions corresponding to color filters 27R, 27G, and 27B of different colors in accordance with the transmission wavelength bands of the color filters 27R, 27G, and 27B. Consequently, the polymeric material of the solution mixture is photopolymerized with different light intensities in different regions corresponding to the color filters 27R, 27G, and 27B.

In this case, the intensity of the laser light L is weakened in an order of a region corresponding to the red filter 27R for transmitting light with a long-wavelength band, a region corresponding to the green filter 27G for transmitting light with an intermediate-wavelength band, and a region corresponding to the blue filter 27B for transmitting light with a short-wavelength band.

That is, in the manufacturing method of this embodiment, the polymeric material of the solution mixture sealed between the two substrates 25 and 26 is photopolymerized by scanning the entire solution mixture sealed region with the laser light L. During this scanning, the intensity of the laser light L is controlled for each of the regions corresponding to the color filters 27R, 27G, and 27B of different colors in accordance with the transmission wavelength bands of these color filters. This makes it possible to adjust the polymerization reaction of the polymeric material in each of the regions corresponding to the color filters 27R, 27G, and 27B. More specifically, when the intensity of the laser light L is increased, the polymerization reaction of the polymeric material is promoted, so small liquid crystal domains 24 are formed by the phase separation with the polymer. When the intensity of the laser light L is decreased, large liquid crystal domains 24 are formed because the polymerization reaction of the polymeric material is discouraged.

For this reason, according to this manufacturing method, it is possible to obtain the liquid crystal/polymer composite film 22 in which, in the regions corresponding to the color filters 27R, 27G, and 27B, the length h of the liquid crystal domains 24 in the direction of thickness of the film differs from one region to another. Consequently, the above-mentioned polymer dispersed liquid crystal display device can be manufactured.

The method of manufacturing the polymer dispersed liquid crystal display device discussed above can also be applied to a device using color filters of other colors, e.g., yellow, magenta, and cyan. In this case, the intensity of the laser light L is weakened in an order of a region corresponding to the filter for yellow as a composite color of red and green, a region corresponding to the filter for magenta as a composite color of red and blue, and a region corresponding to the filter for cyan as a composite color of green and blue.

Figure 7:
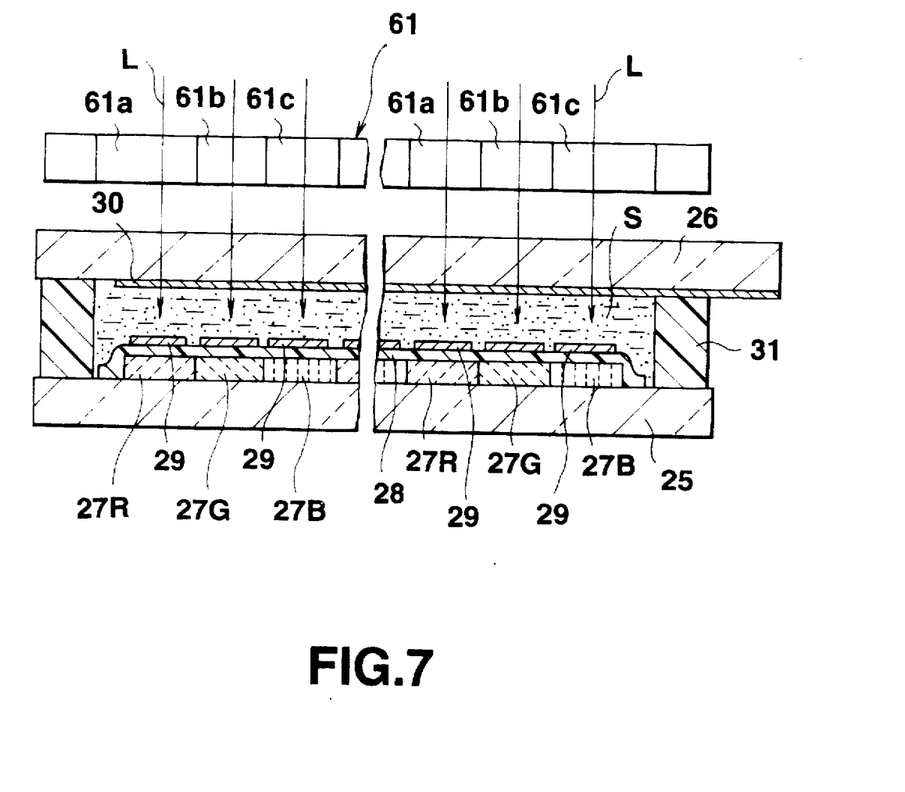
FIG. 7 is a perspective view for explaining another process of polymerizing a polymer of a solution mixture in the manufacture of the display device of the second embodiment.

Another method of manufacturing the polymer dispersed liquid crystal display device will be described below with reference to FIG. 7. FIG. 7 is a sectional view showing a liquid crystal display device in the state in which photopolymerization of a polymer is to be performed. The polymer dispersed liquid crystal display device of the second embodiment discussed earlier is manufactured through the following steps.

First, the first substrate 25 and the second substrate 26 mentioned earlier are bonded via the sealing member 31 between them. The solution mixture S of a liquid crystal and a polymeric material which causes a polymerization reaction upon being irradiated with light is sealed in a region surrounded by the sealing member 31 between the two substrates 25 and 26 by using the vacuum injection process as in the above manufacturing method.

Thereafter, the polymeric material of the solution mixture S is photopolymerized to cause a phase separation between the polymer and the liquid crystal, forming the liquid crystal/polymer composite layer 22. Consequently, the polymer dispersed liquid crystal display device is completed.

The photopolymerization of the polymeric material is performed by irradiating the entire solution mixture sealed region with light (ultraviolet radiation) L from the outer surface side of the second substrate 26 having no color filters 27R, 27G, and 27B. In this case, the light L is radiated on the solution mixture S through a light quantity adjusting mask 61 in which, in portions corresponding to the color filters 27R, 27G, and 27B of different colors, the transmittance differs from one portion to another in accordance with the transmission wavelength bands of the color filters 27R, 27G, and 27B.

In this light quantity adjusting mask 61, the transmittances of portions 61a, 61b, and 61c corresponding to the color filters 27R, 27G, and 27B of different colors are so set that the transmittance is decreased in an order of the portion 61a corresponding to the red filter, the portion 61b corresponding to the green filter, and the portion 61c corresponding to the blue filter. When the light L having a given luminance is radiated on the solution mixture S through this light quantity adjusting mask 61, the light is radiated on regions of the solution mixture S corresponding to the color filters 27R, 27G, and 27B of different colors such that the quantity of the radiated light differs from one region to another. Therefore, the polymeric material of the solution mixture S causes the photopolymerization reaction in accordance with the quantity of the radiated light.

That is, in this manufacturing method, in photopolymerizing the polymeric material of the solution mixture S sealed between the two substrates 25 and 26, light is radiated on the solution mixture sealed region through the light quantity adjusting mask 61 in which the portions 61a, 61b, and 61c corresponding to the color filters 27R, 27G, and 27B, respectively, have different transmittances. Consequently, in the regions of the solution mixture S corresponding to the color filters 27R, 27G, and 27B, the polymeric material of the solution mixture S is photopolymerized with a light quantity which differs from one region to another. If the quantity of the radiated light onto the solution mixture S is increased, the polymerization reaction of the polymeric material is promoted, so small liquid crystal domains are formed by the phase separation with the polymer. If the quantity of the radiated light is decreased, large liquid crystal domains are formed because the polymerization reaction of the polymeric material is discouraged. The result is the liquid crystal/polymer composite film 22, as shown in FIG. 4, in which the regions corresponding to the color filters 27R, 27G, and 27B of different colors have different sizes of the liquid crystal domains 24.

The transmittance of the liquid crystal/polymer composite film 22, on the other hand, varies in accordance with the length h (see FIG. 2) of the liquid crystal domains 24. That is, if the length h of the liquid crystal domains 24 is small, the density of liquid crystal domains 24 in the direction of thickness of the film is high, so the transmittance is low. If the length h of the liquid crystal domains 24 is large, the density of liquid crystal domains 24 in the direction of thickness is low, so the transmittance is high.

For this reason, since the regions corresponding to the color filters 27R, 27G, and 27B of different colors are different in the size of the liquid crystal domains 24 of the composite film 22, the transmittances of the composite film 22 in these regions corresponding to the color filters 27R, 27G, and 27B are nearly the same.

Note that the liquid crystal domains 24 actually formed have irregular shapes, and there are variations in the size of the liquid crystal domains 24 in a region corresponding to a color filter of one particular color. However, in the regions corresponding to the color filters 27R, 27G, and 27B of different colors, if the mean of the lengths h of all the liquid crystal domains 24 present in a region corresponding to a color filter of one specific color differs from one region to another, the wavelength dependence of the transmittance of the composite film 22 can be compensated for.

For this reason, as described above, the quantity of the light radiated onto the solution mixture S is so controlled as to form the liquid crystal/polymer composite film 22 in which the length of the liquid crystal domains 24 in the region opposing the red filter 27R for transmitting light having a long-wavelength band is small, the length of the liquid crystal domains 24 in the region opposing the green filter 24G for transmitting light having an intermediate-wavelength band is medium, and the length h of the liquid crystal domains 24 in the region opposing the blue filter 27B for transmitting light having a short-wavelength band is large. Consequently, light components (red, green, and blue light components) with different wavelength bands transmitted through the color filters 27B, 27G, and 27B of different colors are transmitted through the composite film 22 at nearly the same transmittance.

By manufacturing a polymer dispersed liquid crystal display device in accordance with the manufacturing method discussed above, therefore, it is possible to allow the liquid crystal display device to perform a high-quality multicolor display in which red, green, and blue are displayed at an even brightness without changing the thickness of the color filter or the drive voltage from one region to another, each corresponding to a color filter of one particular color.

In the above method of manufacturing a polymer dispersed liquid crystal display device, the manufacture of the polymer dispersed liquid crystal display device having the color filters 27R, 27G, and 27B of red, green, and blue has been described. However, the present invention can also be applied to the manufacture of a polymer dispersed liquid crystal display device having color filters of other colors. For example, a polymer dispersed liquid crystal display device having color filters of three colors, yellow, magenta, and cyan, can be manufactured by using the light quantity adjusting mask 61 in which the transmittances of the portions 61a, 61b, and 61c corresponding to these color filters are set such that the transmittance is increased in an order of the portion corresponding to the filter for yellow as a composite color of red and green, the portion corresponding to the filter for magenta as a composite color of red and blue, and the portion corresponding to the filter for cyan as a composite color of green and blue.

Note that in both the manufacturing methods mentioned above, the vacuum injection process is used to seal the polymer dispersed liquid crystal layer into the cell. It is, however, also possible to coat the solution mixture S of the liquid crystal material and the polymeric material on at least one of the two substrates 25 and 26 by using, e.g., printing, and to perform photopolymerization.

That is, the composite film used in the first embodiment discussed earlier can be manufactured by coating the solution mixture S on the substrate 15 and executing a polymerization step similar to the polymerization step shown in FIG. 6 or 7. Consequently, the composite film in which regions on which light components with different wavelength bands are incident have different optical characteristics can be obtained.

In addition, the polymer dispersed liquid crystal display device shown in FIG. 3 can be manufactured as follows. That is, the solution mixture S is coated on a substrate on which color filters and electrodes are formed, and the photopolymerization step shown in FIG. 6 or 7 is executed, thereby forming a polymer dispersed liquid crystal layer in which regions corresponding to the color filters of different colors have different optical characteristics. Thereafter, counter electrodes corresponding to the electrodes formed on the above substrate are formed on the polymer dispersed liquid crystal layer, thereby completing the polymer dispersed liquid crystal display device.

Furthermore, the device illustrated in FIG. 4 can be manufactured in the same fashion as for the device illustrated in FIG. 3 described above. That is, this device can be manufactured by forming a polymer dispersed liquid crystal layer on one substrate and adhering the other substrate on which counter electrodes are formed. The device can also be manufactured by coating the solution mixture on one substrate on which color filters and electrodes of one type are formed, adhering the other substrate having counter electrodes, and executing the photopolymerization step shown in FIG. 6 or 7.

Also, in the above embodiments, the manufacturing methods which promote the polymerization reaction of the solution mixture by using light have been described. However, it is also possible to use heat energy as the energy for causing the polymerization reaction of the solution mixture. In this case, the device can be manufactured by using a heat-polymerizing material as the polymeric material, and executing the polymerization step shown in FIG. 6 or 7 by using infrared light.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of manufacturing a polymer-dispersed liquid crystal display device, comprising:

a first step of forming a layer of a solution mixture on one surface of only one substrate, said mixture including (a) a liquid crystal material and (b) a polymeric material polymerizable by supplying energy to promote the polymerization; said substrate including a first electrode and color filters having a red filter for transmitting light components of red color wavelength band, a green filter for transmitting light components of green color wavelength band, and a blue filter for transmitting light components of blue color wavelength band, said red, green, and blue filters arranged at different regions one another, said layer having a first surface on said first electrode and a second surface opposite to said first surface;

a second step of forming a polymer-dispersed liquid crystal layer on said one surface of said substrate by supplying said energy at varying intensity into said layer of solution mixture from a side of said second surface of said layer of said solution mixture thereby to promote the polymerization of said polymeric material for three dimensional polymer network structure in said regions, the varying intensity of said energy being such that the energy differs from one region to another; whereby said regions are essentially the same in light scattering and light transmitting properties; and a third step of arranging a second electrode on said polymer-dispersed liquid crystal layer to oppose said first electrode with said polymer-dispersed liquid crystal layer sandwiched therebetween.

2. A method according to claim 1, wherein the second step includes a polymerization step of radiating light energy for polymerizing said polymeric material such that the light energy differs from one region to another.

3. A method according to claim 1, wherein the first step is the step for forming a layer of a solution mixture consisting of a liquid crystal material and a thermosetting polymeric material on one surface of a substrate, and the second step includes a polymerization step of supplying heat energy for polymerizing said polymeric material such that the heat energy differs from one region to another.

4. A method according to claim 1, wherein the first step is the step for forming a layer of a solution mixture consisting of a liquid crystal material and a polymeric material which sets by reaction upon radiation of light on one surface of a substrate, and the second step includes the polymerization step of radiating light energy for polymerizing said polymeric material such that the light energy differs from one region to another.

5. A method according to claim 1, wherein the second step of supplying energy at varying intensity includes a step of sequentially scanning light for polymerizing said polymeric material such that an intensity of the light differs from one region to another.

6. A method according to claim 4, wherein the second step of supplying energy at varying intensity includes a step of radiating light for polymerizing onto said regions, on which light components with different wavelength bands are incident, via light adjusting means for adjusting the intensity of the polymerization light for each of said regions.

7. A method according to claim 6, wherein the second step of supplying energy at varying intensity includes the step of radiating light onto said regions, on which light components with different wavelength bands are incident, through the light adjusting means having an optical mask whose transmission of the polymerization light intensity differs from one region to another.

8. A method according to claim 6, wherein the second step of supplying energy at varying intensity includes the step of sequentially scanning light onto said regions, on which light components with different wavelength bands are incident, through the light adjusting means having an optical mask whose transmission of the polymerization light intensity differs from one region to another.

9. A method of manufacturing a polymer dispersed liquid crystal display device, comprising:

a first step of filling a solution mixture including a liquid crystal material and a polymeric material causing a polymerization by supplying energy to promote the polymerization between a first substrate and a second substrate, said first substrate having a first electrode and color filters having a first filter for transmitting light components of a first wavelength band, and a second filter for transmitting light components of a second wavelength band longer than the first wavelength band, the first and second filters separate from one region to another, and said second substrate having a second electrode opposing said first electrode and arranged to oppose said first substrate with predetermined spacing therebetween, thereby forming a layer of solution mixture between said first and second substrates; and a second step of polymerizing said polymeric material by supplying said energy for promoting the polymerization of said polymeric material through said second substrate, such that said energy supplied into the region corresponding to the first filter is lower than said energy supplied into the region corresponding to the second filter.

10. A method according to claim 9, wherein the first step includes:

a first substep of arranging said first and second substrates to oppose each other with the predetermined spacing therebetween; and a second substep of filling said solution mixture between said first and second substrates.

11. A method according to claim 9, wherein the first step includes:

a first substep of forming said solution mixture layer by coating said solution mixture on at least one of said first and second substrates; and a second substep of arranging said first and second substrates to oppose each other with the predetermined spacing therebetween.

12. A method according to claim 9, wherein the second step includes a polymerization step or radiating light energy for polymerizing said polymeric material through said second substrate such that an intensity of the light energy differs from one region to another.

13. A method according to claim 12, wherein the polymerization step includes a step of radiating light onto said regions, on which light components with different wavelength bands are incident, via light adjusting means for adjusting the intensity of the polymerization light for each of said regions.

14. A method according to claim 13, wherein the polymerization step includes a step of radiating light onto said plurality of regions, on which light components with different wavelength bands are incident, through the light adjusting means having an optical mask whose transmission the polymerization light intensity differs from one region to another.

15. A method according to claim 12, wherein the polymerization step includes a step of sequentially scanning light for polymerizing said polymeric material such that the intensity of the light differs from one region to another.

16. A method according to claim 9, wherein said color filters have a red filter for transmitting light components of red color wavelength band, a green filter for transmitting light components of green color wavelength band, and a blue filter for transmitting light components of blue color wavelength band, said red, green and blue filters arranged at different regions one another, and the second step includes a light radiation step of radiating light onto said regions of said solution mixture layer corresponding to said color filters, such that energy of the light to be radiated decreases in an order of the region corresponding to said red filter, the region corresponding to said green filter, and the region corresponding to said blue filter.

17. A method according to claim 9, wherein the liquid crystal domains have lengths in direction of thickness of the liquid crystal which differ from one region to another such that said regions are essentially the same in light scattering and light transmitting properties.

18. A method according to claim 9, wherein each of said regions has the liquid crystal domains and a plurality of microscopic polymer portions in which a mean of volumes of said liquid crystal domains differs from one region to another.

19. A method according to claim 9, wherein a mean of length of the liquid crystal domains corresponding to the first filter is longer than a mean of length of the liquid crystal domains corresponding to the second filter.

20. A polymer dispersed liquid crystal display device comprising:

only one substrate;

color filters on said substrate having a red filter for transmitting light components of red color wavelength band, a green filter for transmitting light components of green color wavelength band, and a blue filter for transmitting light components of blue color wavelength band, said red, green, and blue filters arranged at different regions one another;

a first electrode assembly provided adjacent to said color filters;

a composite film which is arranged on said first electrode assembly, said composite film comprising a plurality of liquid crystal domains of non-globular aggregates of liquid crystal material and a polymer three dimensional network structure comprising polymer portions supporting the liquid crystal domains so that averages of areas of interfaces between said liquid crystal domains and said polymer three dimensional network structure in the regions decrease in order of the regions corresponding to said red, green and blue filters for matching light scattering and light transmitting properties of the regions corresponding to said red, green and blue filters; and a second electrode assembly so arranged as to oppose said first electrode assembly with said composite film sandwiched therebetween.

21. A method of manufacturing a polymer-dispersed liquid crystal display device, comprising:

a first step of filling a solution mixture, including a liquid crystal material and a polymeric material which is polymerized by supplying energy to promote the polymerization, between a first substrate and a second substrate, said first substrate including a first electrode and color filters having a red filter for transmitting light components of red color wavelength band, a green filter for transmitting of light components of green color wavelength band, and a blue filter for transmitting light components of blue color wavelength band, said red, green, and blue filters arranged at different regions one another, and said second substrate having a second electrode opposing said first electrode and arranged to oppose said first electrode and arranged to oppose said first substrate with predetermined spacing therebetween, thereby forming a layer of solution mixture between said first and second substrates; and a second step of supplying said energy to said solution mixture without passing through said color filters for promoting the polymerization of said polymeric material, thereby forming a polymer-dispersed liquid crystal layer having a plurality of liquid crystal domains of said liquid crystal material and a plurality of polymer portions supporting said liquid crystal domains, such that said regions are essentially the same in light scattering and light transmitting properties.

22. A method according to claim 21, wherein each of said regions has said liquid crystal domains and said plurality of polymer portions in which said liquid crystal domains have a length in a direction of thickness of said liquid crystal display which differs from one region to another.

23. A method according to claim 21, wherein each of said regions has said liquid crystal domains and said plurality of polymer portions in which a mean of areas of interfaces between said liquid crystal domains and said polymer portions in contact with said liquid crystal domains differs from one region to another.

24. A method according to claim 21, wherein each of said regions has said liquid crystal domains and said plurality of polymer portions in which a mean of volumes of said liquid crystal domains differs from one region to another.

25. A method of manufacturing a polymer-dispersed liquid crystal display device, comprising:

a first step of preparing a first substrate having a first electrode and color filters having a red filter for transmitting light components of red color wavelength band, a green filter for transmitting light components of green color wavelength band, and a blue filter for transmitting light components of blue color wavelength band, said red, green, and blue filters arranged at different regions one another;

a second step of forming a solution mixture layer including a liquid crystal material and a polymeric material which is polymerized by supplying energy to promote the polymerization, on the first electrode, said solution mixture layer having a first surface on said first electrode and a second surface opposite to said first surface;

a third step of forming a single layer of polymer-dispersed liquid crystal having a plurality of liquid crystal domains of said liquid crystal material and a plurality of polymer portions supporting said liquid crystal domains, by supplying said energy toward said second surface of said solution mixture layer so that averages of areas of interfaces between said liquid crystal domains and said polymer-portions in the region decrease in order of the regions corresponding to said red, green and blue filters for matching light scattering and light transmitting properties of the regions corresponding to said red, green and blue filters; and a fourth step of arranging a second substrate having a second electrode on said polymer-dispersed liquid crystal layer such that said second electrode opposite to said first electrode with said polymer-dispersed liquid crystal layer sandwiched therebetween, whereby said regions are essentially the same in light scattering and light transmitting properties.

26. A method according to claim 25, wherein each of said regions has said liquid crystal domains and said plurality of polymer portions in which said liquid crystal domains have a length in a direction of thickness of said liquid crystal display which differs from one region to another.

27. A method according to claim 25, wherein each of said regions has said liquid crystal domains and said plurality of polymer portions in which a means of areas of interfaces between said liquid crystal domains and said polymer portions in contact with said liquid crystal domains differs from one region to another.

28. A method according to claim 25, wherein each of said regions has said liquid crystal domains and said plurality of polymer portions in which a mean of volumes of said liquid crystal domains differs from one region to another.

29. A method according to claim 25, wherein lengths of the liquid crystal domains corresponding to the color filters increase in an order of the red, green and blue filters.

30. A method of manufacturing a polymer-dispersed liquid crystal display device, comprising:

a first step of filling a solution mixture, including a liquid crystal material and a polymeric material, between a first substrate and a second substrate, said first substrate including a first electrode and color filters having a first filter for transmitting light components of a first wavelength band, and a second filter for transmitting light components of a second wavelength hand longer than the first wavelength band, the first and second filters separate from one region to another, and said second substrate having a second electrode opposing said first electrode of the first substrate and arranged to oppose said first substrate with predetermined spacing therebetween;

a second step of supplying energy to said solution mixture for promoting polymerization of said polymeric material so that said solution mixture forms a plurality of liquid crystal domains and a polymer three dimensional network structure between said plurality of liquid crystal domains, an average of areas of interfaces between said liquid crystal domains and said polymer network structure in the region corresponding to the second filter being larger than an average of areas of interfaces in the region corresponding to the first filter.

31. A method according to claim 30, wherein the second step is supplying said energy from only one side of said second substrate of said solution mixture to said solution mixture.

32. A method according to claim 30, wherein an intensity of said energy supplied to said solution mixture decreases in order of regions corresponding to the second and first filters.

33. A method according to claim 32, wherein the second step of supplying energy at varying the intensity includes a step of radiating light for polymerizing to said solution mixture, via light adjusting means for adjusting the intensity of the polymerization light for each of said regions.

34. A method according to claim 32, wherein the second step of supplying energy at varying intensity includes a step of sequentially scanning light for polymerizing said polymeric material such that an intensity of the light differs from one region to another.

35. A method according to claim 32, wherein the first and second filters of said color filters are selected from a red filter for transmitting light components of red color wavelength band, a green filter for transmitting light components of green color wavelength band, and a blue filter for transmitting light components of blue color wavelength band.

36. A method according to claim 30, wherein a mean of length of the liquid crystal domains corresponding to the first filter is longer than a mean of length of the liquid crystal domains corresponding to the second filter.

* * * * *